(12) United States Patent
Yamaguchi et al.

(10) Patent No.: US 7,049,721 B2
(45) Date of Patent: May 23, 2006

(54) ECCENTRIC ROTOR AND A VIBRATING MOTOR USING THE SAME

(75) Inventors: Tadao Yamaguchi, Isesaki (JP); Masahiro Takagi, Isesaki (JP); Satoru Shimosegawa, Isesaki (JP)

(73) Assignee: Tokyo Parts Industrial Co., Ltd., Gunma-ken (JP)

(*) Notice: Subject to any disclaimer, the term of this patent is extended or adjusted under 35 U.S.C. 154(b) by 0 days.

(21) Appl. No.: 10/848,460

(22) Filed: May 17, 2004

(65) Prior Publication Data

US 2005/0116560 A1    Jun. 2, 2005

(30) Foreign Application Priority Data

May 21, 2003    (JP)    ............................. 2003-142770

(51) Int. Cl.
*H02K 7/06*    (2006.01)
(52) U.S. Cl. ....................................................... 310/81
(58) Field of Classification Search ................. 310/43, 310/71, 81, 232–235
See application file for complete search history.

(56) References Cited

U.S. PATENT DOCUMENTS 5,793,133 A * 8/1998 Shiraki et al. ................. 310/81
6,566,772 B1 * 5/2003 Yamaguchi .................. 310/81

* cited by examiner

*Primary Examiner*—Thanh Lam
(74) *Attorney, Agent, or Firm*—Jordan and Hamburg LLP

(57) ABSTRACT

An eccentric rotor wherein a printed wiring board in which commutator segments are formed at a first surface, two wound air-cored coils arranged with a prescribed arrangement angle about the shaft as a center at the second surface of the printed wiring board, and a weight are integrally molded into a disk-like shape with a resin by injection molding. The weight comprises a first surface of the weight which is exposed at the side surface of the rotor together with the first surface of the printed wiring board and a second surface of the weight which is exposed at the other surface of the rotor together with the wound air-cored coil. The resin which integrates the aforementioned components and forms an outer peripheral resin portion having a circular-arc periphery about the shaft as a center. The outer contours of the weight and printed wiring board are so formed as to assume positions separated from the outer periphery inwardly in a circular-arc portion. In the circular-arc portion at the outer periphery of the rotor, a continuous circular-arc protrusion covering the first surface of the weight and the first surface of the printed wiring board at one surface side of the rotor is formed integrally with the outer peripheral resin portion.

17 Claims, 5 Drawing Sheets

ECCENTRIC ROTOR AND A VIBRATING MOTOR USING THE SAME

BACKGROUND OF THE INVENTION

1. Field of the Invention

The present invention relates to the improvement of a molded eccentric rotor employed, for example, as silent call means in portable communication devices and to the configuration of a flat and thin coreless vibration motor of an axial-gap type which comprises the rotor.

2. Description of the Prior Art

A molded eccentric rotor in which vibrations are generated by centrifugal force of the rotor itself is composed of a flat crescent-shaped eccentric rotor in which an air-cored armature coil is shifted to one side. Such an eccentric rotor has been suggested long time ago by the applicant of the present invention in JP Published Application No. 6-205565.

However, miniaturization and width reduction of portable communication devices have also created a demand for smaller and thinner components installed in portable communication devices. For example, if a diameter of 12 mm and a thickness of about 3 mm are required, then in a flat crescent-shaped eccentric rotor in which an air-cored armature coil is shifted to one side and which conventionally had an advantageous structure with a diameter of about 14 mm, the displacement of the center of gravity is small and the centrifugal vibrations are insufficient, making it necessary to employ an auxiliary weight composed of a component with a high specific gravity.

For this purpose, the applicant has suggested a structure in which the required weight and displacement of the center of gravity is obtained by the so-called two-color molding in which a component with a high specific gravity which is composed of a tungsten alloy powder or block is molded with a resin (JP Published Application No. 11-73542).

In such a molded eccentric rotor, a guide hole matching the diameter of the corresponding air-gap armature coil and a first-turn connection pattern are provided in a printed wiring board where the air-gap armature coil is to be installed, and after the air-gap armature coil has been installed, the printed wiring board is turned downward and integrated molding is conducted by injection molding from the side of the upper air-gap armature coil (JP Published Application No. 8-16346 and No. 11-113231).

For cost reduction, it was suggested to remove one of the three three-phase air-gap armature coils, to shift the remaining two flat coils to one side, and further increase the eccentricity by auxiliary disposing a member with a high specific gravity at the displacement side (JP Published Application No. 2000-286030).

However, though such a structure was effective in motors with a diameter of about 14 mm, when it was employed in motors with a diameter of about 10 mm and a thickness of about 2 mm in configurations with an auxiliary weight, especially such that it protruded to a magnet, the rotor thickness was sacrificed and the rotor was difficult to employ. Another drawback was that in configurations with an arrangement opening angle of the two coils of 120 degrees, the portion of the auxiliary weight was small and the eccentricity as a whole was small.

Further, it order to use a flat vibration motor equipped with such an eccentric rotor as silent call means of a portable communication device, a mounting surface has to be flat to provide for direct installation via a two-sided adhesive or the like on the printed wiring board of the device.

Moreover, a power supply terminal for supplying electric power to a brush is led out to the side peripheral portion of the motor and connected to the power supply pattern provided in the printed wiring board of the device.

Such flat motors are driven with an axial field-type ring-shaped magnet. Therefore, proper attention has to be paid to the power supply structure for supplying power to a brush disposed in the inner portion of the magnet.

SUMMARY OF THE INVENTION

If a flat small motor with a diameter of 10 mm and a thickness of 2 mm is expected to satisfy the miniaturization requirements, then an eccentric weight made of a tungsten alloy with a specific gravity of 18 is required to generate centrifugal vibrations with the rotor itself. However, in the motors of such size, the radial movement of the center of gravity is small. Therefore, a motor with a large amount of eccentricity cannot be obtained by employing a conventional technological concept according to which an eccentric weight made of a tungsten alloy with a high specific gravity is confined within an empty space at the eccentric side between the two flat air-cored armature coils. The present invention was created by thoughtfully designing the structure of the eccentric weight made from a tungsten alloy and the arrangement space thereof. It is an object of the present invention to provide an eccentric rotor that can ensure a high impact resistance despite the increased eccentricity and also to provide a motor of reduced thickness which incorporates such an eccentric rotor.

In order to resolve the aforementioned problems, the eccentric rotor in accordance with the present invention is an eccentric rotor which is rotatably supported on a shaft fixed to a housing of a vibration motor. A printed wiring board has a plurality of commutator segments are formed at a first surface, and two wound air-cored coils are arranged with a prescribed arrangement angle about the shaft as a center at the second surface of the printed wiring board. A weight is integrally molded into a disk-like shape with a resin by injection molding, the weight comprising a first surface which is exposed at the side surface of the rotor together with the first surface of the printed wiring board and a second surface of the weight is exposed at the other surface of the rotor together with the wound air-cored coil. The resin forms an outer peripheral resin portion having a circular-arc periphery about the shaft as a center and fills the space between the air-cored coil and the weight at the other surface side of the rotor. The outer contours of the weight and printed wiring board are so formed as to assume positions separated from the outer periphery inwardly in a circular-arc portion, and in the circular-arc portion, a continuous circular-arc protrusion covering the first surface of the weight and the first surface of the printed wiring board at one surface side of the rotor is formed integrally with the outer peripheral resin portion.

With such a configuration, a large eccentricity of the eccentric rotor can be obtained despite the miniaturization and thickness reduction of the eccentric rotor following the miniaturization and thickness reduction of the vibration motor, and an eccentric rotor with excellent impart resistance can be obtained.

Thus, employing the configuration in which both surfaces of the weight are exposed at the rotor surface makes it possible to use effectively the thickness of the rotor, including the thickness of the printed wiring board. Further, providing a continuous circular-arc protrusion such that the resin covers the outer peripheral portion of the rotor and that the first surface of the printed wiring board and the weight are covered with the circular-arc outer peripheral portion makes it possible to support the weight with the resin and increase the impact resistance.

Further, it is possible to increase further the eccentricity and also to increase the impact resistance.

A vibration motor of a fixed shaft system can be constructed by using the eccentric rotor in accordance with the present invention.

DETAILED DESCRIPTION OF THE PREFERRED EMBODIMENTS

The drawings illustrating the embodiments of the present invention will be described hereinbelow.

The preferred embodiment of the present invention based on the aforementioned drawings will be explained below.

Figure 1:
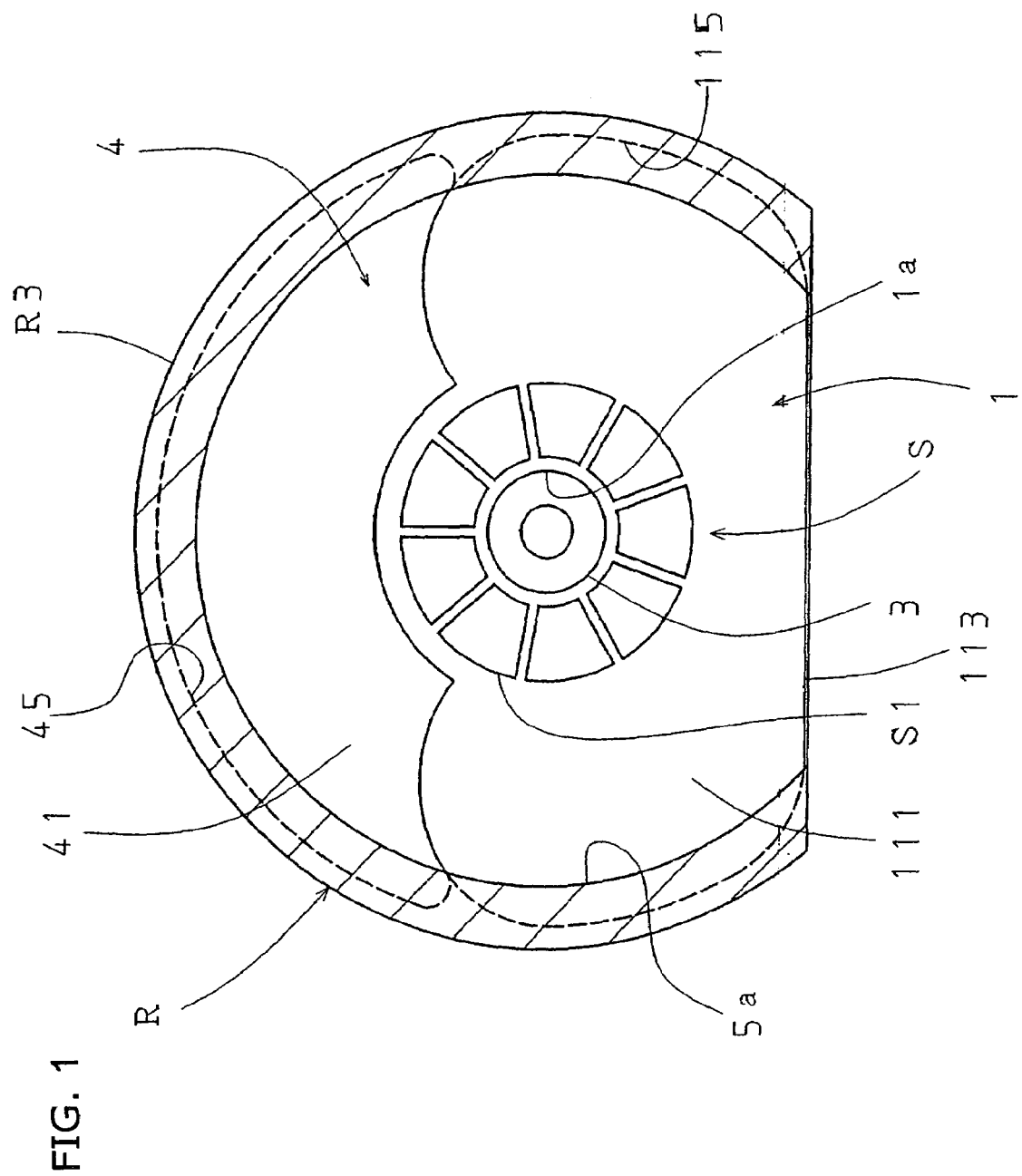
FIG. 1 is a bottom view from one surface side of the rotor according to a first embodiment of the eccentric rotor in accordance with the present invention.
Figure 2:
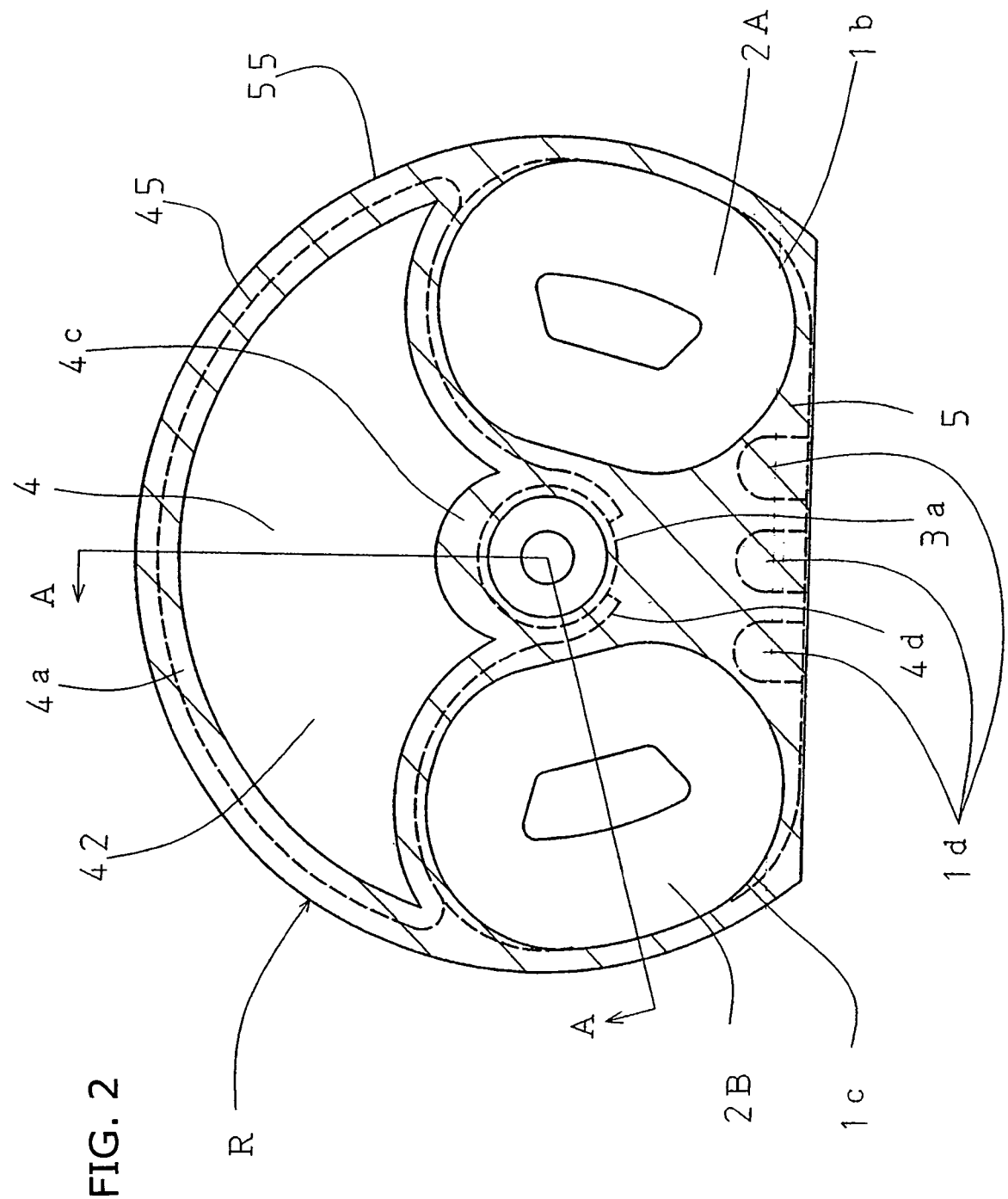
FIG. 2 is a plan view from the other surface side of the eccentric rotor.

FIG. 1 and FIG. 2 illustrate an eccentric rotor R which is obtained by molding in a mold. FIG. 1 is a view from the side of one surface R1 of the rotor R, and FIG. 2 is a view from the side of the other surface R2 equivalent to the rear side of FIG. 1.

The eccentric rotor R is obtained by integrally molding a sintered oil-impregnated bearing 3 arranged in a rotation center, a printed wiring board 1, an eccentric weight 4, and two air-cored armature coils 2A, 2B by injection molding with a resin 5 so conducted as to obtain a disk-like shape.

The printed wiring board has a shaft insertion hole 1a provided in the rotation center of the rotor R1. At the first surface 111 thereof, a commutator S composed of a plurality of commutator segments S1 is formed by printing around the shaft insertion hole 1a.

Installation areas 1b, 1c are provided at a second surface 112 of the printed wiring board 1 so that two air-cored armature coils 2A, 2B can be installed therein. Further, a notched portion 113 is formed, the lower side thereof being cut to assume a linear shape, as a whole, in the plan view thereof.

The air-cored armature coils 2A, 2B are fixed in the installation areas 1b, 1c at an arrangement angle of less than 180 degrees (for example, 150 degrees or 170 degrees) about the rotation center of the rotor R as a center.

Three terminal wire patterns id are provided between the air-cored armature coils 2A, 2B in the notched portion 113 at the second surface 112 of the printed wiring board 1, and the terminals of the air-cored armature coils 2A, 2B are connected.

The eccentric weight 4 is a flat plate made of a tungsten alloy and is arranged at a side with an angle of 180 degrees or more, which is opposite to the side where the air-cored armature coils 2A, 2B are arranged at an arrangement angle of less than 180 degrees. In the eccentric weight 4, a first surface 41 where the resin does not flow in during injection molding is formed as a surface substantially identical to the first surface 111 of the printed wiring board 1, and this surface together with the surface 111 of the printed wiring board 1 is exposed at one surface R1 of the rotor R. Furthermore, a second surface 42 of the weight which is opposite to the first surface 41 of the weight is at the side of the air-cored armature coils 2A, 2B and is likewise exposed at the second surface R2 of the rotor R.

The size of the weight can be increased if the outer contour of the weight 4 which is adjacent to the coils 2A or 2B is as close to the coil as possible or similar to the contour of the printed wiring board.

The sintered oil-impregnated bearing 3 is formed from a cylindrical oilless metal and is disposed at the rotation center.

When the aforementioned components are integrated with the resin 5 by injection molding, the resin 5 fills the gaps between the coil and coil, coils and weight, and coils and bearing, thereby integrating all the components.

Further, the resin 5 also reaches the outer side in the radial direction of the coils 2A, 2B and weight 4 at the outer peripheral side of the coils 2A, 2B and weight 4, and the rotor R is resin molded so as to form an outer peripheral resin portion 55 in the form of a circular arc with the rotation center as a center.

A large eccentricity can be obtained if a resin with a specific gravity of 1.8 or less is used as the resin 5 and if a sintered tungsten alloy with a high specific gravity is used as the weight 4.

At the printed wiring board 1, there are also provided a conductive pattern for connecting the terminals of air-cored armature coils 2A, 2B to each segment pattern via the three terminal wire patterns 1d and printed resistors for spark prevention, but those components are not shown in the figures.

Further, the wiring state in which the terminals of the wound air-cored armature coils 2A, 2B are connected to each segment pattern via the three terminal wire patterns 1d is illustrated by the below-described FIG. 4 and FIG. 5 that illustrate the operation, and the explanation of this wiring state is herein omitted.

The substantial center of the effective conductor portion of the wound air-cored armature coils 2A, 2B may be almost equal to that of the opening angle of the magnetic poles of the incorporated magnet, but the size of the weight 4 can be increased correspondingly to the reduction in the size of the outer contour of the coils, if the substantial center of the effective conductor portion is somewhat decreased within a range where no large counter-torque is generated.

The eccentric weight 4 is formed to have a flat fan-like shape with the rotation center as a reference. A first step-like portion 4a is formed at the outer contour 45 of a circular-arc portion. When it is configured as the eccentric rotor R, the thickness of the portions where the first surface 41 and the second surface 42 are formed is a combined thickness of the air-cored armature coils 2A, 2B and the printed wiring board 1. As a result, the eccentricity is increased by enlarging the weight 4 by the thickness of the printed wiring board 1, while avoiding a negative effect of the thickness of the eccentric rotor R on miniaturization.

In the printed wiring board 1, the outer contour 115 of the portion of the outer peripheral resin portion 55 is formed to be somewhat less than the maximum outer contour of the outer peripheral resin portion 55 of the rotor. The resin 5 protrudes to the side of the surface R1 in the axial direction via this gap, thereby forming a protrusion 5a.

Figure 3:
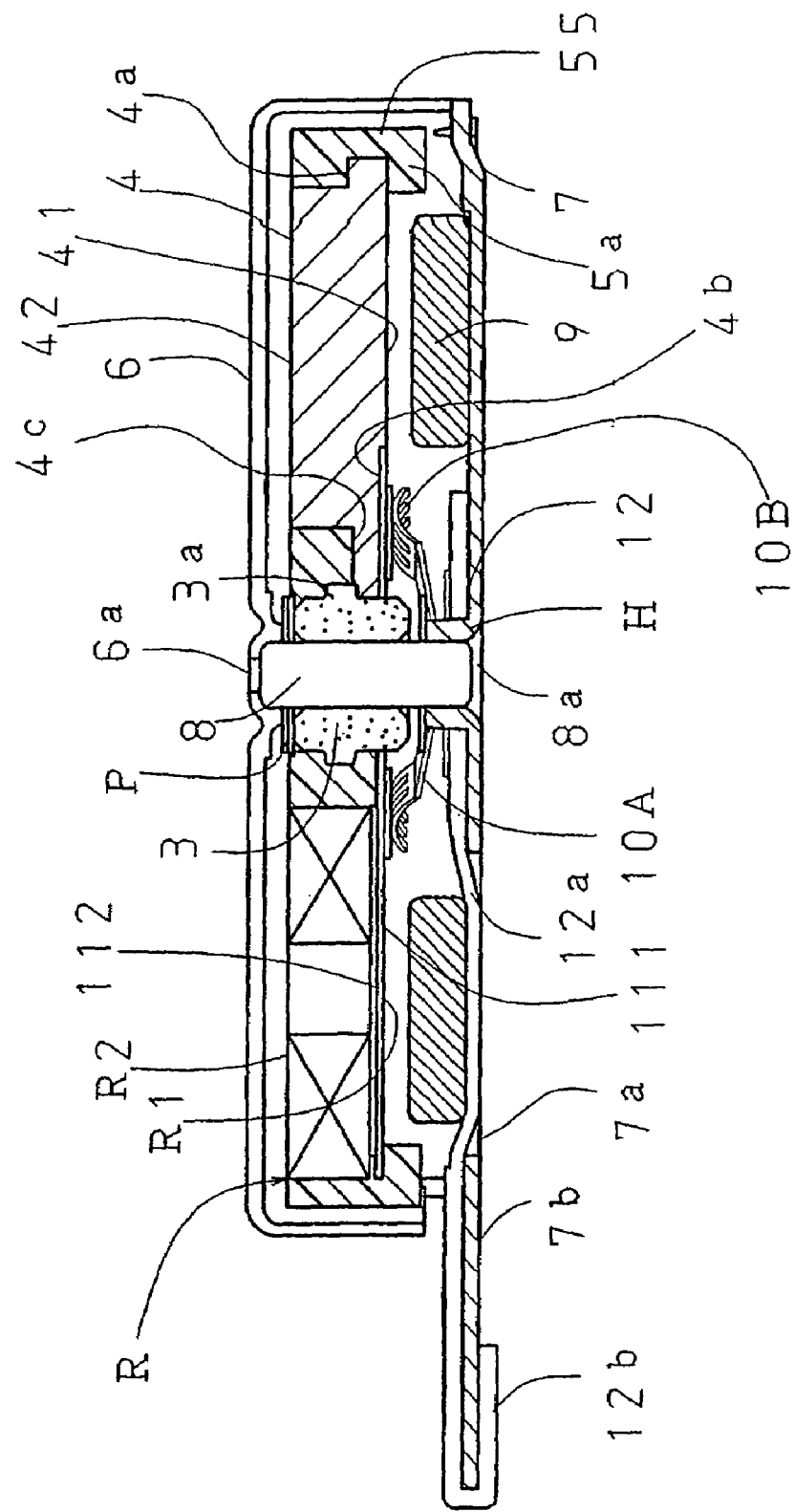
FIG. 3 shows a coreless vibration motor of an axial gap type which is provided with the aforementioned eccentric rotor and is a cross-sectional view along the A—A line of the portion of the eccentric rotor shown in FIG. 2.

Further, the circular-arc portion 45 of the weight 4 is also formed somewhat less than the outer peripheral portion 55 in the form of a circular arc, the resin 5 protrudes to the side of the surface R1 in the axial direction via this outer contours portion and forms the protrusion 5a connected to the portion of the printed wiring board 1. As shown in FIGS. 1 and 3, the protrusion 5a comprises the respective outer contours 115, 45 and covers the respective first surfaces 111, 41 in a circular arc fashion.

This protrusion 5a is accommodated in the space formed between the below-described ring-like magnet 9 and case 6 and there is no risk of this protrusion impeding the miniaturization of the motor.

Furthermore, the first step-like portion 4a of the eccentric weight 4 is supported by the outer peripheral portion 55 in the form of a circular arc and the protrusion 5a serves as reinforcing means for locking the eccentric weight 4 in the axial direction.

Further, as shown in FIG. 3, the second step-like portion 4b is provided and extended toward the center so that the zone between the coils 2A, 2B overlaping the printed wiring board 1, thereby increasing the mass of the weight 4. A third step-like portion 4c is provided in part thereof and the weight 4 is covered with the resin so that it is not exposed at the side of surface R2 of the rotor R.

As a result, the bearing side of the weight 4 also serves as a reinforcement for locking.

Further, a resistance to radial impacts is increased if a portion 4d is so provided that it covers the sintered oil-impregnated bearing 3 disposed in the center, so that part thereof is surrounded.

If the eccentric weight is provided with a sufficient strength in the radial direction, this portion surrounding the bearing becomes unnecessary.

Further, in accordance with a motor size, for example, a diameter of 10–14 mm, and with consideration for current consumption and centrifugal force, a material with a density (specific gravity) of 17–18.4 is selected for the eccentric weight 4.

The sintered oil-impregnated bearing 3 has a cylindrical shape and is provided in the shaft insertion hole 1a of the printed wiring board 1, as shown in FIG. 3. It is used for rotatably supporting the eccentric rotor R on a bracket 7 with the below-described shaft 8. Further, a protruding portion 3a is provided at the outer periphery in the central portion in the axial direction of this cylinder. By means of this protruding portion 3a, the locking strength of the sintered-oil impregnated bearing 3, after molding in the mold, has increased resistance to movement in the axial direction with respect to the eccentric rotor R.

Further, the same effect can be obtained if the protruding portion 3a is formed intermittently, rather than along the entire outer periphery of the cylindrical sintered oil-impregnated bearing 3. In this case, the mounting strength in the tangential direction can be also increased.

The resin 5 with a low density (specific gravity) is selected so as to prevent, as effectively as possible, the position of the center of gravity from being offset. Thus a high-strength resin with a density (specific gravity) of about 1.4 which is obtained by introducing glass fibers into a resin with a density of 2 or less such as a polybutylene terephthalate resin that has good moldability and regeneration ability is selected.

FIG. 3 shows an ultrathin coreless vibration motor with a thickness of about 2 mm which is constructed by using the above-described molded eccentric rotor R.

This vibration motor comprises a case 6 obtained by drawing a thin magnetic stainless steel sheet with a thickness of 0.15 mm and a housing H in the form of a bracket 7 with a thickness of about 0.15 mm that was mounted in the opening of the case.

Inside the case, a shaft 8 with a diameter of about 0.6 mm is press fitted and fixed in the center of the bracket 7, and six magnetized thin-ring-like magnets 9 are installed NS alternately and outwardly in the radial direction of the shaft 8. The base end 8a of the shaft 8 may be laser welded instead of being press fitted or may be press fitted and then welded.

The above-described molded eccentric rotor R with a thickness of about 0.8 mm is rotatably mounted on the shaft 8 and installed adjacently to the ring-like magnets 9 via an axial gap.

Electric power is supplied to the molded eccentric rotor R from a pair of brushes 10A, 10B via a commutator portion 1s. The eccentric rotor R is represented by a cross-sectional view along the A—A line in FIG. 2.

The the eccentric rotor R, part of the resin 5 protrudes in the axial direction on the outer periphery of the ring-like magnets 9 and in the spatial portion on the inner side of the case 6, and reinforcing means for locking the eccentric weight 4 in the axial direction is provided by using the step-like portion 4b of the eccentric weight 4.

In the bracket 7, the brushes 10A, 10B are implanted in the flexible base 12 by soldering or thermally fusing at the base thereof, so that the sliding contacts get inside the magnet 9. In the aforesaid bracket 7, part of the position of the magnet 9 serves as a through hole 7a, a power supply lead portion 12a is extended in the radial direction, passed through the hole 7a, and led out as a power supply electrode portion 12b to the side of the case 6.

Therefore, when the flexible base 12 is led outwardly from between the magnet 9 and the bracket 7, a sufficient lead-out space of the flexible base 12 with a thickness of about 0.15 mm can be enabled, even if the thickness of the bracket 7 is as small as about 0.15 mm.

Here, the flexible base 12 may be adhesively fixed to the bracket 7 and magnet 9 by applying an adhesive to the prescribed surface.

The power supply electrode portion 12b of the flexible base 12 is folded back in a portion of a tongue 7b protruding from the bracket 7, and the soldering electrode is exposed in the three directions, thereby facilitating solder connection to the printed wiring board at the device side.

On the other hand, in the case 6 constituting the other part of the housing, a through hole 6a in the form of a bar ring for mounting the other end of the shaft 8 made of stainless steel and described in detail hereinabove is disposed in the center, and several polyimide films 6 are attached to avoid sliding loss around the through hole 6a. The molded eccentric rotor R is brought into sliding contact with the polyimide film P by a push-down force of a pair of brushes 10A, 10B via the bearing 3.

Therefore, because the eccentric rotor R is constantly impelled toward the case 6 and rotatably held down by the polyimide film, it does not move anymore toward the case 6, the gap therebetween is ensured, a risk of collision is avoided, a constant gap with the case 6 is maintained, a spread in the rotation position is prevented, and a stable rotary support can be obtained.

The other end of the shaft 8 is laser welded in the portion of the through hole 6a in the form of a bar ring to the case.

Therefore, a risk of the shaft 8 coming out of the through hole 6a is prevented, even if the motor is subjected to impacts, for example, if it falls down.

Figure 4:
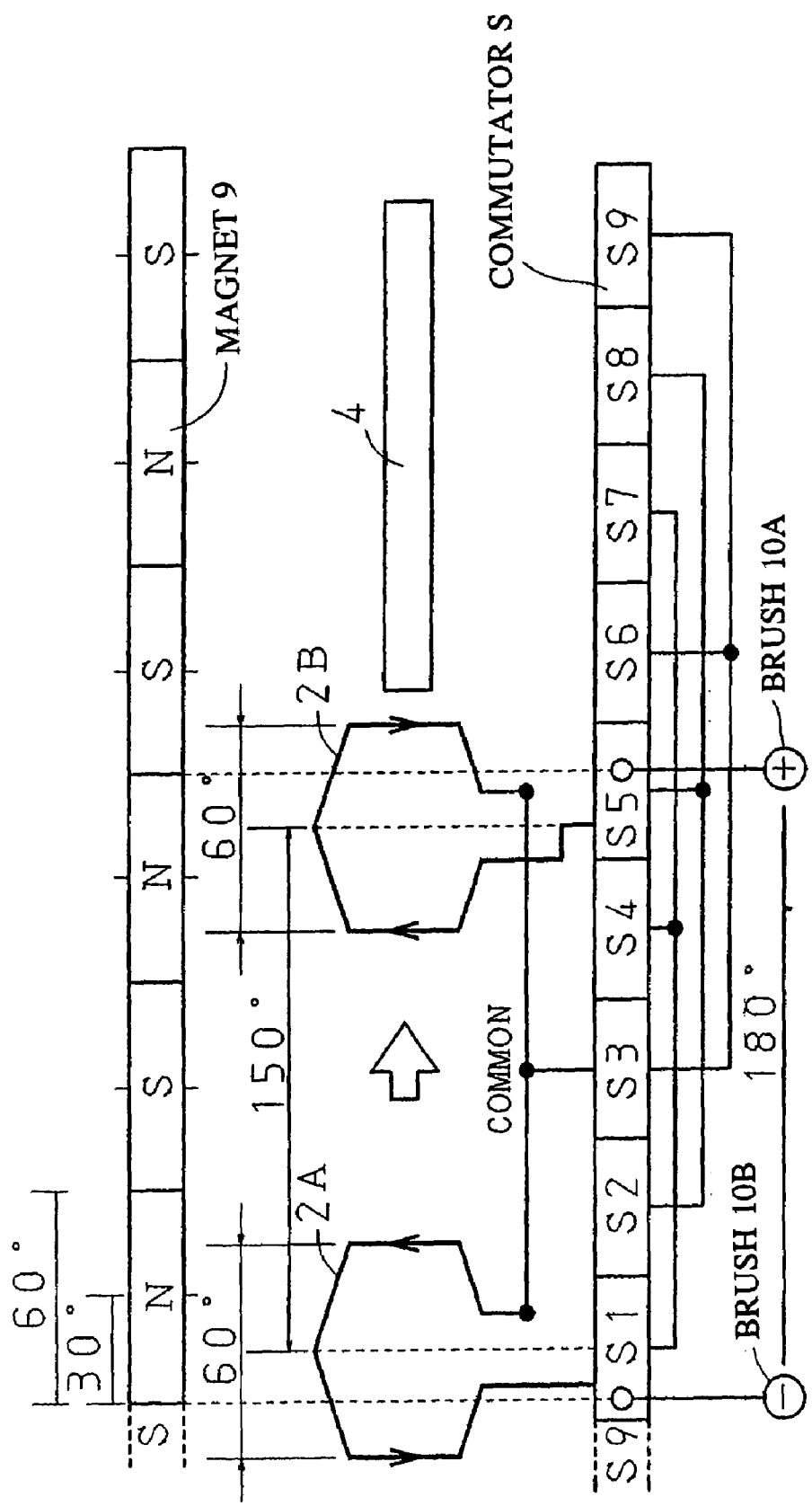
FIG. 4 shows a rotation principle of the motor shown in FIG. 3 and illustrates the case with an arrangement an opening angle of air-cored armature coils of 150 degrees.
Figure 5:
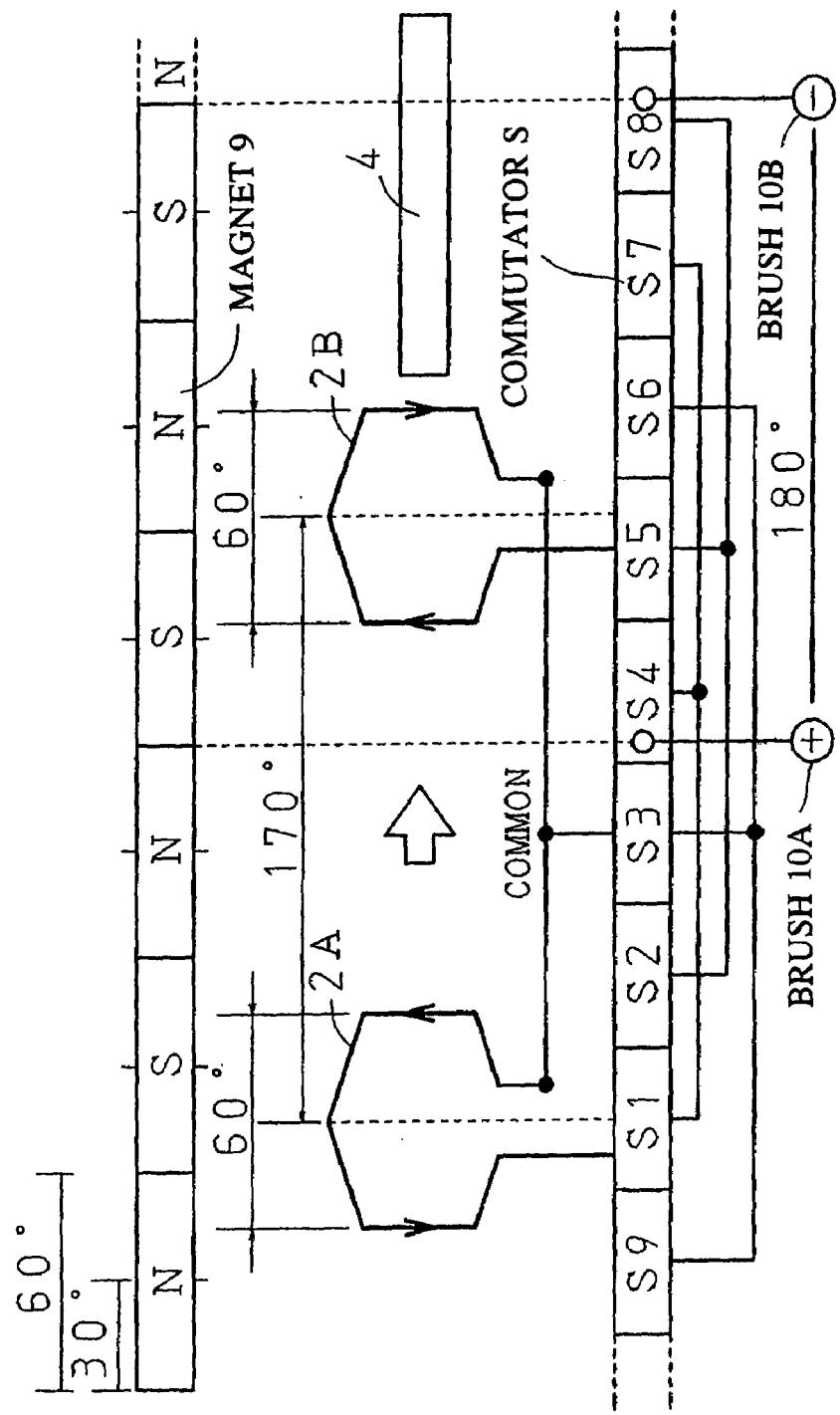
FIG. 5 shows a rotation principle of the motor shown in FIG. 3 and illustrates the operation when the arrangement opening angle of air-cored armature coils is 170 degrees.

FIG. 4 and FIG. 5 illustrate the operation of the ultrathin coreless vibration motor having the above-described configuration. FIG. 4 shows a state in which six field magnets 9 with alternating NS poles, a commutator S composed of nine segments S1 to S9, positive and negative brushes 10A, 10B which are in sliding contact with the commutator S at an opening angle of 180 degrees in the position of a neutral part of the magnet 9, and effective conductor portions of the wound air-cored commutator foils 2A, 2B configured at an arrangement angle of 150 degrees contribute to a torque. Thus, the first-turn terminal of the wound air-cored commutator foil 2A is connected to the segment S1 of the commutator S, the last-turn terminal thereof together with the last-turn terminal of the wound air-cored commutator foil 2B is connected to the segment S3 of the commutator, and the last-turn terminal of the coil 2B is connected to the segment S5 of the commutator.

In each segment of the commutator, three conductors which are short circuited by two conductors are formed by printing wiring or the like, and the segments are integrated with the zone K1 where the tungsten alloy weight, as an eccentric rotor R, is wider.

If electric power is supplied to the eccentric rotor R that was thus constructed, with the positive and negative brushes 10A, 10B that are in sliding contact with the neutral portions of the magnet, a rotary force is generated in the direction shown by an arrow in the air-cored armature coils 2A, 2B, according to the Fleming's left-hand rule by the DC current which is supplied from the brush 10A and is zeroed in the brush 10B.

FIG. 5 shows a state in which the effective conductor portions on both sides of the wound air-cored armature coils 2A, 2B configured at an arrangement angle of 170 degrees contribute to the torque. Because the wiring relationship is identical to that shown in FIG. 4, the explanation thereof is omitted. It is clear that in this case, too, the rotation is not accompanied by counter-torque.

What is claimed is:

1. An eccentric rotor rotatably about an axis of rotation and having a first side and a second side, comprising:
   a printed wiring board, two wound air-cored coils arranged juxtaposed to the printed wiring board, a weight, and a resin structure integrally molding said printed wiring board, said air cored coils and said weight into a disk-like shape;
   said printing board having a first side and a plurality of commutator segments on said first side;
   said weight having a first side which is exposed at the first side of the rotor together with the first side of the printed wiring board and a second side of the weight which is exposed at the second side of the rotor together with the air cored coils;
   said resin structure having an outer peripheral portion having a circular-arc periphery about the axis of rotation; and
   said outer peripheral portion of said resin structure having a projection extending in an axial direction from the first side of the rotor and having one part superimposed with the first side of the weight and another part superimposed with the first side of the printed wiring board.

2. The eccentric rotor according to claim 1, wherein said resin structure has an inner circular arc portion disposed radially inwardly of said outer peripheral portion, said air cored coils and said weight being disposed between said outer peripheral portion and said inner circular arc portion.

3. The eccentric rotor according to claim 2, wherein said resin structure has an intermediate portion extending between said outer peripheral portion and said inner circular arc portion, said intermediate portion extending between said weight and said air cored coils.

4. The eccentric rotor according to claim 3, wherein said weight has an outer circular arc periphery with said rotational axis being the center, said weight having first and second arcuate sections extending from said outer circular arc periphery of said weight, said first and second arcuate sections being juxtaposed to and spaced from said two air cored coils respectively to form two intermediate spaces, said intermediate resin structure being disposed in said intermediate spaces.

5. The eccentric rotor according to claim 4, wherein each of said first and second air cored coils have arcuate sections which are juxtaposed to and spaced from said first and second arcuate sections of said weight such that said intermediate spaces have an arcuate configuration.

6. The eccentric rotor according to claim 3, wherein a part of said intermediate portion of said resin structure is exposed to the second side of said rotor.

7. The eccentric rotor according to claim 2, wherein said inner circular arc portion of said resin structure has a section disposed in superimposed relationship with a section of said printed wiring board.

8. The eccentric rotor according to claim 2, wherein said inner circular arc portion of said resin structure has a section disposed in superimposed relationship with a part of said printed wiring board and with a part of said weight.

9. The eccentric rotor according to claim 1, wherein said weight has an outer peripheral projecting part, said resin structure having a U-shaped section disposed about said outer peripheral projecting part of said weight.

10. The eccentric rotor according to claim 1, wherein said weight has a first axial thickness and said air cored coils and said printed circuit board together have a second axial thickness equal to said first axial thickness.

11. The eccentric rotor according to claim 10, wherein said weight has an indented section which accommodates a section of the printed wiring board, said indented section of said weight and said section of said printed wiring board together having a thickness equal to said first and second axial thickness.

12. The eccentric rotor according to claim 1, wherein at least part of said projection is disposed in superimposed relationship with said printed wiring board.

13. An eccentric rotor rotatably about an axis of rotation and having a first side and a second side, comprising:
   a printed wiring board, two wound air-cored coils arranged juxtaposed to the printed wiring board, a weight, and a resin structure integrally molding said printed wiring board, said air cored coils and said weight into a disk-like shape;
   said printing board having a first side and a plurality of commutator segments on said first side;
   said weight having a first side which is exposed at the first side of the rotor together with the first side of the printed wiring board and a second side of the weight which is exposed at the second side of the rotor together with the air cored coils; and
   said weight having an outer circular arc peripheral surface with said rotational axis being the center, said weight having first and second arcuate surfaces extending from said outer circular arc peripheral surface of said weight, said first and second arcuate surfaces being juxtaposed to and spaced from said two air cored coils respectively to form two intermediate spaces, said resin structure having an intermediate arcuate portion disposed in said intermediate spaces.

14. A vibration motor comprising a ring-like magnet, a brush and an eccentric rotor, a housing accommodating the magnet, the brush, and the eccentric rotor, a shaft fixed to the housing for rotatably supporting the eccentric rotor, said eccentric rotor, comprising;

a printed wiring board, two wound air-cored coils arranged juxtaposed to the printed wiring board, a weight, and a resin structure integrally molding said printed wiring board, said air cored coils and said weight into a disk-like shape;

said printing board having a first side and a plurality of commutator segments on said first side;

said weight having a first side which is exposed at the first side of the rotor together with the first side of the printed wiring board and a second side of the weight which is exposed at the second side of the rotor together with the air cored coils;

said resin structure having an outer peripheral portion having a circular-arc periphery about the axis of rotation; and said outer peripheral portion of said resin structure having a projection extending in an axial direction from the first side of the rotor and having one part superimposed with the first side of the weight and another part superimposed with the first side of the printed wiring board.

15. A vibration motor comprising a magnet, a brush and an eccentric rotor, a housing accommodating the magnet, the brush, and the eccentric rotor, a shaft for rotatably supporting the eccentric rotor, said eccentric rotor comprising;

a printed wiring board, two wound air-cored coils arranged juxtaposed to the printed wiring board, a weight, and a resin structure integrally molding said printed wiring board, said air cored coils and said weight into a disk-like shape;

said printing board having a first side and a plurality of commutator segments on said first side;

said weight having a first side which is exposed at the first side of the rotor together with the first side of the printed wiring board and a second side of the weight which is exposed at the second side of the rotor together with the air cored coils;

said resin structure having an outer peripheral portion having a circular-arc periphery about the axis of rotation;

said resin structure having an inner circular arc portion disposed radially inwardly of said outer peripheral portion; and said resin structure having an intermediate portion extending between said outer peripheral portion and said inner circular arc portion, said intermediate portion extending between said weight and said air cored coils.

16. The eccentric rotor according to claim 15, wherein a part of said intermediate portion of said resin structure is exposed to the second side of the rotor.

17. A vibration rotor comprising a magnet, a brush and an eccentric rotor, a housing accommodating the magnet, the brush, and the eccentric rotor, a shaft for rotatably supporting the eccentric rotor, said eccentric rotor, comprising;

a printed wiring board, two wound air-cored coils arranged juxtaposed to the printed wiring board, a weight, a bearing and a resin structure integrally molding said printed wiring board, said air cored coils said weight and said bearing into a disk-like shape;

said printing board having a first side and a plurality of commutator segments on said first side;

said weight having a first side which is exposed at the first side of the rotor together with the first side of the printed wiring board and a second side of the weight which is exposed at the second side of the rotor together with the wound air cored coil; and said weight having an outer circular arc peripheral surface with said rotational axis being the center, said weight having first and second arcuate surfaces extending from said outer circular arc peripheral surface of said weight, said first and second arcuate surfaces being juxtaposed to and spaced from said two air cored coils respectively to form two intermediate spaces, said resin structure having an intermediate portion disposed in said intermediate spaces.

* * * * *